(12) United States Patent
Natarajan et al.

(10) Patent No.: US 10,414,920 B2
(45) Date of Patent: Sep. 17, 2019

(54) ELASTOMERIC COMPOSITION AND PROCESS FOR ITS PREPARATION

(71) Applicant: LEIBNIZ-INSTITUT FUER POLYMERFORSCHUNG DRESDEN E.V., Dresden (DE)

(72) Inventors: Tamil Selvan Natarajan, Dresden (DE); Amit Das, Dresden (DE); Klaus Werner Stoeckelhuber, Freiberg (DE); Hai Le Hong, Halle (DE); Rene Jurk, Schwarzheide (DE); Sven Wiessner, Dresden (DE); Gert Heinrich, Hannover (DE)

(73) Assignee: LEIBNIZ-INSTITUT FUER POLYMERFORSCHUNG DRESDEN E.V., Dresden (DE)

( * ) Notice: Subject to any disclaimer, the term of this patent is extended or adjusted under 35 U.S.C. 154(b) by 77 days.

(21) Appl. No.: 15/600,075

(22) Filed: May 19, 2017

(65) Prior Publication Data
US 2017/0342265 A1 Nov. 30, 2017

(30) Foreign Application Priority Data
May 25, 2016 (DE) .................. 10 2016 109 620

(51) Int. Cl.
C08L 71/03 (2006.01)
C08L 71/02 (2006.01)
C08K 3/30 (2006.01)

(52) U.S. Cl.
CPC ................ C08L 71/03 (2013.01); C08K 3/30 (2013.01); C08L 71/02 (2013.01); C08L 2312/00 (2013.01)

(58) Field of Classification Search
CPC ....... C08L 71/03; C08L 71/02; C08L 2312/00
USPC ......................................................... 524/414
See application file for complete search history.

(56) References Cited

U.S. PATENT DOCUMENTS

| 5,328,948 A | 7/1994 | Sandstrom et al. | |
| 5,328,949 A | 7/1994 | Sandstrom et al. | |
| 5,741,828 A * | 4/1998 | Stoy | A61L 29/085 524/501 |
| 7,217,751 B2 | 5/2007 | Durel et al. | |
| 9,540,501 B2 * | 1/2017 | Choi | C08L 33/18 |
| 2007/0225425 A1 * | 9/2007 | Nash | C08C 19/12 524/500 |
| 2011/0086942 A1 | 4/2011 | Robission et al. | |

FOREIGN PATENT DOCUMENTS

| DE | 102014214144 | * 1/2016 |
| WO | 03/016387 | 2/2003 |
| WO | 2013/158487 | 10/2013 |

OTHER PUBLICATIONS

Translation of DE102014214144, dated Jan. 21, 2016. (Year: 2016).*
Bots, P.; Benning, L. G.; Rodriguez-Blanco, J.-D.; Roncal-Herrero, T.; Shaw, S. *Crystal Growth & Design* 2012, 12, (7), 3806-3814.
Ogino, T.; Suzuki, T.; Sawada, K. *Journal of crystal growth* 1990, 100, (1-2), 159-167.
Freyer, D.; Voigt, W. *Monatshefte für Chemie/Chemical Monthly* 2003, 134, (5), 693-719.
De Choudens-Sanchez, V.; Gonzalez, L. A. *Journal of Sedimentary Research* 2009, 79, (6), 363-376.
Gopi, S.; Subramanian, V. *Indian J. Chem., Sect A* 2013, 52A.
Blount, C. W.; Dickson, F. W. *American Mineralogist: Journal of Earth and Planetary Materials* 1973, 58, (3-4_Part_1), 323-331.
Ostroff, A. *Geochimica et Cosmochimica Acta* 1964, 28, (9), 1363-1372.

* cited by examiner

*Primary Examiner* — Hui H Chin
(74) *Attorney, Agent, or Firm* — Greenblum & Bernstein, P.L.C.

(57) ABSTRACT

An elastomeric composition that has a high tensile strength and high hardness is produced by a method that is cost-efficient and easy to carry out. The object is attained by an elastomeric composition that contains at least one base elastomer, at least one hydrophilic polymer, and at least one inorganic salt. The object is furthermore attained by a method for producing an elastomeric composition in which at least one rubber, at least one hydrophilic polymer and at least one inorganic salt are mixed and subsequently vulcanized, the elastomeric composition is then at least partially brought into contact with water, and afterwards the water is at least partially removed from the elastomeric composition. The elastomeric composition according to the invention can, for example, be used in vehicles and machines as a seal, grommet, disc, coupling or membrane.

25 Claims, No Drawings

ELASTOMERIC COMPOSITION AND PROCESS FOR ITS PREPARATION

CROSS-REFERENCE TO RELATED APPLICATIONS

The present application claims priority under 35 U.S.C. § 119(a) of German Patent Application No. 10 2016 109 620.2 filed May 25, 2016, the disclosure of which is expressly incorporated by reference herein in its entirety.

The invention concerns the field of polymer chemistry and relates to an elastomeric composition and a method for the production thereof. The elastomeric composition according to the invention can, for example, be used in vehicles and machines as a seal, grommet, disc, coupling or membrane.

Materials and components composed of elastomeric compounds are required in many fields of application and are expected to exhibit a highly diverse range of properties. Through the use of fillers in elastomeric materials, the physical properties of the material can be modified, optimized and adapted for use in practice.

Carbon black or finely dispersed silica ($SiO_2$) are most often used as filler. The mechanical properties of the elastomeric material are influenced by the formation of secondary bonds between the elastomer molecules and the particles of the filler. In this manner the strength, elastic modulus or abrasion resistance, for example, of the elastomeric materials are significantly improved, whereby an improved abrasion strength or an increased tear resistance is achieved.

Also known is the use of carbon nanotubes, graphene and other nanomaterials as fillers which, due to the small particle size, can be suitably dispersed in the elastomeric material.

From U.S. Pat. No. 5,328,949 A, a rubber composition is known that is quantitatively reinforced with silicic acid. The rubber composition thereby comprises a rubber that is reinforced with a combination of silicic acid and specified binder.

From WO 2003 016387 A1, a diene rubber composition is known which is produced from at least one diene elastomer and comprises an inorganic reinforcing filler and a binder. The inorganic filler comprises at least silica and has a specific BET surface area between 45 and 400 $m^2/g$, a specific CTAB surface area between 40 and 380 $m^2/g$, and an average particle size of 20 to 300 nm.

From U.S. Pat. No. 7,217,751 A, a rubber composition based on one or more diene elastomers and a binder is known, in which aluminum oxide is used as a reinforcing filler and which has a BET surface area in the range of 30 to 400 $m^2/g$, an average particle size after ultrasonic disagglomeration of less than or equal to 500 nm, and a high content of Al—OH surface reactive functional groups while having high dispersibility.

Furthermore, from US 20 110 086 942 A1 a rubber is known involving the use of a reactive filler, which reinforces the rubber in situ. This elastomeric composition is provided for use in a borehole and comprises a base polymer and a reinforcing reactive filler including a matrix of discrete sections of a first material that are arranged in the base polymer, wherein the reinforcing filler can be a cement powder or an epoxy.

A disadvantage of the known solutions is that the elastomeric compositions still exhibit too low of a tensile strength and hardness, and that the known production methods are cost-intensive and laborious.

The object of the present invention is the specification of an elastomeric compound that has a high tensile strength and high hardness, and the specification of a production method that is cost-efficient and easy to carry out.

The object is attained by the specified invention. Advantageous embodiments are the subject of the dependent claims, wherein the invention also includes combinations of the individual dependent claims within the meaning of an and -operation, provided that they are not mutually exclusive.

The elastomeric composition according to the invention contains at least one base elastomer, at least one hydrophilic polymer and at least one inorganic salt, wherein auxiliary materials can be present.

In the composition according to the invention, it is advantageous if the base elastomer is a vulcanized natural rubber, acrylonitrile-butadiene rubber (NBR), carboxylated NBR (XNBR), hydrogenated NBR (HNBR), epichlorohydrin-ethylene oxide rubber (GECO), acrylic rubber (ACM), ethylene-propylene-diene monomer rubber (EPDM), chloroprene rubber (CR), butadiene rubber (BR), styrene-butadiene rubber (SBR), polyurethane rubber (PU), fluorinated rubber (FKM) and/or silicone rubber (VMQ).

It is also advantageous if the hydrophilic polymer is an alkylene oxide copolymer, a poly(ethylene oxide-co-alkylene oxide) copolymer, a poly(ethylene oxide-alkylene oxide) copolymer, sodium polyacrylate, polyvinyl alcohol, polyacrylic acid, polyacrylamide, carboxymethyl cellulose, poly(acrylic acid-co-acrylamide), poly(hydroxyethyl methacrylate), ethylene oxide-propylene oxide-allyl glycidyl ether, a polycaprolactone-b-poly(ethylene oxide) copolymer, a poly(styrene-ethylene oxide) block copolymer, poly(epichlorohydrin-co-ethylene oxide), poly(ethylene-co-propylene oxide), polyether polyol, a poly(ethylene oxide)-poly(propylene oxide)-poly(ethylene oxide) triblock copolymer, a poly(phosphazene)-poly(ethylene oxide) copolymer, a polylactide-block-poly(ethylene oxide) copolymer, poly(ethylene oxide)-block-poly(amino acid), propylene glycol-ethylene glycol polycondensate, poly(ethylene oxide-co-propylene oxide-co-butylene oxide) and/or a resin.

The resin can advantageously be a thermoplastic polymer resin, epoxy resin, polyester resin, polyurethane resin, polyacrylate resin, melamine resin, phenol-formaldehyde resin, polyacrylonitrile resin, polyaspartic resin, polyurea resin, polyvinyl butyral resin, urea-formaldehyde resin, ebonite resin, cyanoacrylate resin and/or vinyl ester resin.

Advantageously, in the elastomeric composition, the hydrophilic polymer is present at 30-60 phr.

It is also advantageous if the inorganic salt is calcium sulfate ($CaSO_4$), calcium sulfate dihydrate ($Ca[SO_4].2H_2O$), calcium sulfate hemihydrate ($Ca[SO_4].\frac{1}{2}H_2O$), calcium hydrogen phosphate ($CaHPO_4$) and/or calcium hydrogen phosphate dihydrate ($CaHPO_4.2H_2O$) and is present at 30-50 phr.

Advantageously crosslinkers, compatibilizers, activators, accelerators, retardants, antioxidants, plasticizers and/or antiozonants are present as auxiliary materials.

Sulfur, peroxides and/or amines are advantageously present at 0.5-6 phr as crosslinkers.

Polyglycol, methacrylate and/or dialkyl diether glutarate are advantageously present at 10-30 phr as compatibilizers.

It is particularly advantageous if additional crosslinking sites from unsaturated compounds with or without functional groups and/or saturated compounds with functional groups are present. The functional groups are thereby advantageously carboxyl groups, hydroxyl groups or amino groups.

With the method according to the invention for producing an elastomeric composition, at least one rubber, at least one hydrophilic polymer and at least one inorganic salt are mixed and subsequently vulcanized, the elastomeric composition is then at least partially brought into contact with water, and afterwards the water is at least partially removed from the elastomeric composition.

In the method according to the invention natural rubber, acrylonitrile-butadiene rubber (NBR), carboxylated NBR (XNBR), hydrogenated NBR (HNBR), epichlorohydrin-ethylene oxide rubber (GECO), acrylic rubber, ethylene-propylene-diene monomer rubber (EPDM), chloroprene rubber (CR), butadiene rubber (BR), styrene-butadiene rubber (SBR), polyurethane rubber (PU), fluorinated rubber and/or silicone rubber is advantageously used as rubber.

It is likewise advantageous if sodium polyacrylate, polyvinyl alcohol, polyacrylic acid, polyacrylamide, carboxymethyl cellulose, poly(acrylic acid-co-acrylamide), poly(hydroxyethyl methacrylate), ethylene oxide-propylene oxide-allyl glycidyl ether (GEPO) and/or a resin is used as a hydrophilic polymer.

Additionally, it is advantageous if calcium sulfate ($CaSO_4$), calcium sulfate dihydrate ($Ca[SO_4].2H_2O$), calcium sulfate hemihydrate ($Ca[SO_4].½H_2O$), calcium hydrogen phosphate ($CaHPO_4$) and/or calcium hydrogen phosphate dihydrate ($CaHPO_4.2H_2O$) is used as an inorganic salt.

It is also advantageous if auxiliary materials are added before the vulcanization.

It is also advantageous if the rubber, the hydrophilic polymer and the inorganic salt are homogeneously mixed and subsequently vulcanized for 6-20 minutes at temperatures of 140° C.-180° C.

It is particularly advantageous if the elastomeric composition is fully brought into contact with water.

Also advantageously, the elastomeric composition is brought into contact with water for 2-6 h, wherein the elastomeric composition is particularly advantageously brought into contact with deionized or distilled water.

Advantageously, the absorbed water is removed from the elastomeric composition for 3-4 h at 50° C.-60° C., or for 24-48 h at room temperature.

It is particularly advantageous if, after the removal of the absorbed water, the elastomeric composition is subjected to a heat treatment at 160° C. to 220° C.

With the solution according to the invention, it is for the first time possible to provide an elastomeric composition which has a high tensile strength and high hardness. Additionally, with the solution according to the invention, it is possible to adjust the properties of the elastomeric composition specifically to the desired area of application.

This is achieved by an elastomeric composition that contains at least one base elastomer, at least one hydrophilic polymer, and at least one inorganic salt.

For the production of the base elastomer, natural rubber or synthetic rubbers, such as for example acrylonitrile-butadiene rubber (NBR), carboxylated NBR (XNBR), hydrogenated NBR (HNBR), epichlorohydrin-ethylene oxide rubber (GECO), acrylic rubber (ACM), ethylene-propylene-diene monomer rubber (EPDM), chloroprene rubber (CR), butadiene rubber (BR), styrene-butadiene rubber (SBR), polyurethane rubber (PU), fluorinated rubber (FKM) and/or silicone rubber (VMQ) can be used according to the invention. The base elastomer is present after the vulcanization of the rubbers. The base elastomer can thereby have been produced from a single rubber, or from a blend of two or more rubbers.

It is particularly advantageous if polar rubbers, such as for example epichlorohydrin-ethylene oxide rubber (GECO), acrylic rubber, carboxylated NBR (XNBR) and/or polyurethane rubber (PU), are used. Because of their polarity, these rubbers exhibit better compatibility with the hydrophilic polymer and the inorganic salt.

Furthermore, the elastomeric composition contains at least one hydrophilic polymer. An alkylene oxide copolymer, a poly(ethylene oxide-co-alkylene oxide) copolymer, a poly(ethylene oxide-alkylene oxide) copolymer, sodium polyacrylate, polyvinyl alcohol, polyacrylic acid, polyacrylamide, carboxymethyl cellulose, poly(acrylic acid-co-acrylamide), poly(hydroxyethyl methacrylate), ethylene oxide-propylene oxide-allyl glycidyl ether, a polycaprolactone-poly(ethylene oxide) copolymer, a poly(styrene-ethylene oxide) block copolymer, poly(epichlorohydrin-co-ethylene oxide), poly(ethylene-co-propylene oxide), polyether polyol, a poly(ethylene oxide)-poly(propylene oxide)-poly(ethylene oxide) triblock copolymer, a poly(phosphazene)-poly(ethylene oxide) copolymer, a polylactide-block-poly(ethylene oxide) copolymer, poly(ethylene oxide)-block-poly(amino acid), propylene glycol-ethylene glycol polycondensate, poly(ethylene oxide-co-propylene oxide-co-butylene oxide) and/or a resin are preferably present as hydrophilic polymers.

A thermoplastic polymer resin, epoxy resin, polyester resin, polyurethane resin, polyacrylate resin, melamine resin, phenol-formaldehyde resin, polyacrylonitrile resin, polyaspartic resin, polyurea resin, polyvinyl butyral resin, urea-formaldehyde resin, ebonite resin, cyanoacrylate resin and/or vinyl ester resin is preferably present as resin.

One, two, or more hydrophilic polymers can be present in the elastomeric composition. Advantageously 30 to 60 phr of the hydrophilic polymer is present.

With the solution according to the invention, it is possible that the elastomeric composition can absorb water via the hydrophilic polymer. The degree of water adsorption $W_A$ (in %) can be determined using the formula $$W_A=[(M_S-M_O)/M_O]\cdot 100$$

wherein $M_O$ is the mass of the elastomeric composition prior to the water absorption, and $M_S$ is the mass of the elastomeric composition after the water absorption.

According to the invention, the degree of water absorption is especially important, since the reinforcing effect of the inorganic salt present in the elastomeric composition is especially influenced thereby. The inorganic salt is, for example, calcium sulfate ($CaSO_4$), calcium sulfate dihydrate ($Ca[SO_4].2H_2O$), calcium sulfate hemihydrate ($Ca[SO_4].½H_2O$), calcium hydrogen phosphate ($CaHPO_4$) and/or calcium hydrogen phosphate dihydrate ($CaHPO_4.2H_2O$).

The inorganic salt is capable of reacting with the water absorbed via the hydrophilic polymer, wherein a hydration and crystallization of the inorganic salt is achieved. The process of hydration and the subsequent crystallization of the inorganic salt are referred to as adjustment. The process of hydration thereby denotes the accumulation of water molecules on dissolved ions (Wikipedia, German-language search term "Hydration"). Ions are thereby formed during the hydration of the inorganic salt which subsequently, during the removal of the water, that is, the drying of the elastomeric composition, form hydrates during the crystallization. These hydrates of the inorganic salts exhibit a higher compressive strength than the amorphous crystals of the inorganic salts prior to the water treatment. Through the adjustment of the inorganic salt, it is achieved that particularly strong and rigid crystal lattices are produced, whereby a particularly suitable reinforcement of the elastomeric composition is achieved.

During the adjustment, the inorganic salt exhibits morphological alterations in the crystalline structures. The crystals of the inorganic salt are thus present in thrombocytic structures before the hydration and crystallization. After the adjustment of the inorganic salt, the crystals are present in the shape of rods and needles. After the adjustment, the inorganic salt is present in the form of nanocrystallites, whereby a particularly suitable dispersion of the inorganic salt is achieved with the base elastomer and the hydrophilic polymer.

To achieve a uniform reinforcement of the entire elastomeric composition, it is important that the inorganic salt and the hydrophilic polymer be present in the elastomeric composition in a homogeneously distributed manner. In this way, it is also achieved that the inorganic salt comes into contact as completely as possible with the water absorbed via the hydrophilic polymer. In addition to the inorganic salt, other auxiliary materials and/or fillers can also be present.

The elastomeric composition contains, for example, crosslinkers such as sulfur, peroxides and/or amines as auxiliary materials, wherein the crosslinkers are present at 0.5-6 phr.

Other auxiliary materials can for example be compatibilizers, activators, accelerators, retardants, antioxidants, plasticizers, other fillers, and/or antiozonants.

Compatibilizers are primarily present when two or more hydrophilic polymers that have only limited compatibility are used. The compatibility depends on the degree of polarity of the selected base elastomer and the ratio of the selected base elastomer to the selected hydrophilic polymer. Thus, the absence of a compatibilizer in this system can lead to phase separation and significantly influence the properties of the elastomeric composition.

With the addition of at least one compatibilizer, these disadvantages are eliminated, wherein the compatibilizer can comprise polar and nonpolar molecular groups. Preferably, the compatibilizer is polyglycol, methacrylate and/or dialkyl diether glutarate and is present at 10-30 phr.

By means of accelerators and/or retardants, the rate of the adjustment of the inorganic salt can be influenced. Advantageously, inorganic acids or strong or weak bases, such as for example $K_2SO_4$ or $Ca(OH)_2$, are present as accelerators. Weak organic acids and the salts thereof, such as for example citric acid, malic acid or adipic acid, or strong bases are advantageously present as retardants.

In addition, the elastomeric composition can also contain antioxidants and/or plasticizers.

Advantageously, compounds that belong to the amines group, hydroquinones group or phenols group are present as antioxidants. Preferably, the antioxidants are thereby present at 1-5 phr in the elastomeric composition.

Aromatic, paraffin-containing and/or naphthenic oils are advantageously present as plasticizers. Auxiliary materials of this type facilitate the production method, for example, and are advantageously present at 1-5 phr.

In addition, it is advantageous if, in the elastomeric composition, additional crosslinking sites on the polymer chains are present. These crosslinking sites can be unsaturated compounds with or without functional groups and/or saturated compounds with functional groups. The functional groups can be carboxyl groups, hydroxyl groups or amino groups. In this manner, it is achieved that the crosslinking between the at least one base elastomer and the at least one hydrophilic polymer is further improved, and the elastomeric composition further stabilized after the absorption of the water.

With the method according to the invention, elastomeric compositions that have a high tensile strength and high hardness are produced for the first time using a cost-effective and simple method.

This is achieved in that at least one rubber, at least one hydrophilic polymer and at least one inorganic salt are mixed and subsequently vulcanized, the elastomeric composition is then at least partially brought into contact with water, and afterwards the water is at least partially removed from the elastomeric composition.

Within the scope of the present invention, rubber is to be understood as meaning all unvulcanized elastomeric polymers, and elastomers are to be understood as meaning all elastomeric polymers vulcanized from rubbers.

In the first method step, the at least one rubber is mixed with the at least one hydrophilic polymer and the at least one inorganic salt. The mixing process should thereby be performed until the hydrophilic polymer and the inorganic salt are distributed as homogeneously as possible in the rubber. During the mixing process, auxiliary materials can be added and blended in, so that these auxiliary materials are also present in the elastomeric composition in a homogeneously distributed manner.

After the mixing and the subsequent vulcanization, the elastomeric composition is at least partially brought into contact with water. The contact with water occurs, for example, in that the elastomeric composition is partially or completely immersed in water.

The degree of water absorption is, among other things, dependent on the hydrophilic polymer used and the duration and type of contact with the water. It is thus possible for the elastomeric composition to only partially come into contact with water. In this manner, it is achieved that the elastomeric composition absorbs water only partially, in individual spatial regions. However, the elastomeric composition can also be fully brought into contact with water. In this case, it is particularly important that the hydrophilic polymer is present in the elastomeric composition in a homogeneously distributed manner. In this way, it is achieved that the inorganic salt can fully come into contact with the absorbed water.

Advantageously, by means of the contact of the elastomeric composition with water, at least 20% and maximally 125% deionized or distilled water, based on the mass of the elastomeric composition, is absorbed by the hydrophilic polymer. Even more advantageously, 100% water, based on the mass of the elastomeric composition, is absorbed by the hydrophilic polymer.

After the contact, the water is removed from the elastomeric composition. This takes place by means of drying, which should be as complete as possible. Complete drying is to be understood within the scope of the invention as meaning that the degree of water absorption $W_A$ after the drying is <5%.

The duration of the drying is, among other things, dependent on the achieved degree of water absorption and the ambient temperature present during the drying. Advantageously, the drying can be carried out for 24 to 48 hours at room temperature (22° C.). However, it is also possible that the drying is carried out for 3 to 4 hours at 50° C. to 60° C.

A further advantage of the method according to the invention is that the process of adjusting the inorganic salt is reversible and the accompanying reinforcement of the elastomeric composition can be undone. This is achieved in that the reinforced elastomeric composition is subjected to an additional heat treatment between 120° C. to 220° C. after the adjustment of the inorganic salt. The morphological changes in the inorganic salt achieved beforehand by the adjustment are thereby reversed again, and the original amorphous state of the inorganic salt is restored. It is thus possible to provide a mechanically adaptive elastomeric composition, the properties of which can be adapted to the changing fields of application as often as desired.

The invention is explained below in greater detail with the aid of two exemplary embodiments:

EXEMPLARY EMBODIMENT 1

An elastomeric composition was produced in that the rubber, the hydrophilic polymer and the inorganic salt were mixed in a two-roll mixer for 15 min at 60° C. according to Table 1.

TABLE 1

| Constituent | Selection | Phr |
|---|---|---|
| Rubber | Epichlorohydrin-ethylene oxide rubber (Hydrin T3108) - (GECO) | 50 |
| Hydrophilic polymer | Ethylene oxide-propylene oxide-allyl glycidyl ether (Zeospan 8030) (GEPO) | 50 |
| Inorganic salt | Calcium sulfate ($CaSO_4$) | 50 |
| Activator | Zinc oxide | 3 |
| Accelerator | Stearic acid | 2 |
| Accelerator | Tetramethylthiuram disulfide (TMTD) | 2.5 |
| Accelerator | Mercaptobenzothiazole (MBT) | 1 |
| Crosslinker | Sulfur | 1 |

The activator, accelerator and crosslinker were subsequently added to the mixture, and the mixture was then vulcanized in a hot press for 10 min at 160° C. and afterwards cooled for 60 min to room temperature (22° C.). The sample produced in this manner was then fully immersed in distilled water and, after 2 h, removed again from the distilled water. The water-treated elastomeric composition was then dried for 48 h at room temperature.

The results of the subsequently performed mechanical analysis of the unfilled composition, as well as the $CaSO_4$-filled elastomeric composition and the water-treated, $CaSO_4$-filled elastomeric composition are shown in Table 2.

TABLE 2

| Sample | Tensile strength (MPa) | Elongation at break (%) | Elastic modulus at 60° C. (MPa) | Hardness A |
|---|---|---|---|---|
| GECO-GEPO without $CaSO_4$ | 2.16 | 180 | 7 | 45 |
| GECO-GEPO with $CaSO_4$, without water treatment | 2.75 | 260 | 9 | 51 |
| GECO-GEPO with $CaSO_4$, with water treatment after 2 hours | 4.52 | 272 | 57 | 78 |

The results show significantly improved mechanical properties, in particular the tensile strength and hardness of the elastomeric composition reinforced with the inorganic salt following the water treatment.

Using XRD analyses, it was verified that the amorphous $CaSO_4$ crystals are converted into crystalline $CaSO_4$ crystals by means of the water treatment of the elastomeric composition. Transmission electron microscopy showed the formation of nanoscale and highly developed salt crystals after the water treatment. The plate-shaped morphology of the $CaSO_4$ crystals was converted to nanorods and nanoneedles.

EXEMPLARY EMBODIMENT 2

The elastomeric composition reinforced by the water treatment according to Exemplary Embodiment 1 was subjected to a heat treatment for 60 minutes at a temperature of 200° C. and then cooled for 3 h at room temperature (22° C.). Dynamic mechanical analyses and strength tests were subsequently performed on the elastomeric composition. The results of the analyses are listed in Table 3 and show that the original morphological state of the inorganic salt was restored as a result of the heat treatment of the reinforced elastomeric composition.

TABLE 3

| Sample | Elastic modulus at 60° C. (MPa) | Hardness A |
|---|---|---|
| GECO-GEPO-$CaSO_4$ without water treatment | 9 | 51 |
| GECO-GEPO-$CaSO_4$ after 2 h water treatment | 57 | 78 |
| GECO-GEPO-$CaSO_4$ after 2 h water treatment, drying and heat treatment for 1 h at 200° C. | 10 | 53 |

The invention claimed is:

1. An elastomeric composition comprising at least one base elastomer, at least one hydrophilic polymer and at least one inorganic salt, wherein auxiliary materials can be present, and the inorganic salt comprises at least one of calcium sulfate ($CaSO_4$), calcium sulfate dihydrate ($Ca[SO_4] \cdot 2H_2O$), calcium sulfate hemihydrate ($Ca[SO_4] \cdot \frac{1}{2}H2O$), calcium hydrogen phosphate ($CaHPO_4$), or calcium hydrogen phosphate dihydrate ($CaHPO_4 \cdot 2H_2O$).

2. The elastomeric composition according to claim 1 in which the base elastomer is a vulcanized natural rubber, acrylonitrile-butadiene rubber (NBR), carboxylated NBR (XNBR), hydrogenated NBR (HNBR), epichlorohydrin-ethylene oxide rubber, acrylic rubber (ACM), ethylene-propylene diene-monomer rubber (EPDM), chloroprene rubber (CR), butadiene rubber (BR), styrene-butadiene rubber (SBR), polyurethane rubber (PU), fluorinated rubber and/or silicone rubber.

3. The elastomeric composition according to claim 1 in which the hydrophilic polymer is an alkylene oxide copolymer, a poly(ethylene oxide-co-alkylene oxide) copolymer, a poly(ethylene oxide-alkylene oxide) copolymer, sodium polyacrylate, polyvinyl alcohol, polyacrylic acid, polyacrylamide, carboxymethyl cellulose, poly(acrylic acid-co-acrylamide), poly(hydroxyethyl methacrylate), ethylene oxide-propylene oxide-allyl glycidyl ether, a polycaprolactone-b-poly(ethylene oxide) copolymer, a poly(styrene-ethylene oxide) block copolymer, poly(epichlorohydrin-co-ethylene oxide), poly(ethylene-co-propylene oxide), polyether polyol, a poly(ethylene oxide)-poly(propylene oxide)-poly(ethylene oxide) triblock copolymer, a poly(phosphazene)-poly(ethylene oxide) copolymer, a polylactide-block-poly(ethylene oxide) copolymer, poly(ethylene oxide)-block-poly(amino acid), propylene glycol-ethylene glycol polycondensate, poly(ethylene oxide-co-propylene oxide-co-butylene oxide) and/or a resin.

4. The elastomeric composition according to claim 3 in which the resin is thermoplastic polymer resin, epoxy resin, polyester resin, polyurethane resin, polyacrylate resin, melamine resin, phenol-formaldehyde resin, polyacrylonitrile resin, polyaspartic resin, polyurea resin, polyvinyl butyral resin, urea-formaldehyde resin, ebonite resin, cyanoacrylate resin and/or vinyl ester resin.

5. The elastomeric composition according to claim 1 in which the hydrophilic polymer is present at 30-60 phr.

6. The elastomeric composition according to claim 1 in which the inorganic salt is present at 30-50 phr.

7. The elastomeric composition according to claim 1 in which crosslinkers, compatibilizers, activators, accelerators, retardants, antioxidants, plasticizers and/or antiozonants are present as auxiliary materials.

8. The elastomeric composition according to claim 7 in which sulfur, peroxides and/or amines are present at 0.5-6 phr as crosslinkers.

9. The elastomeric composition according to claim 7 in which polyglycol, methacrylate and/or dialkyl diether glutarate are present at 10-30 phr as compatibilizers.

10. The elastomeric composition according to claim 1 in which additional crosslinking sites from unsaturated compounds with or without functional groups and/or saturated compounds with functional groups are present.

11. The elastomeric composition according to claim 10 in which the functional groups are carboxyl groups, hydroxyl groups or amino groups.

12. A method for producing an elastomeric composition comprising mixing at least one rubber, at least one hydrophilic polymer and at least one inorganic salt and subsequently vulcanizing the mixture, the elastomeric composition is then at least partially brought into contact with water, and afterwards the water is at least partially removed from the elastomeric composition wherein the inorganic salt comprises at least one of calcium sulfate ($CaSO_4$), calcium sulfate dihydrate ($Ca[SO_4].2H_2O$), calcium sulfate hemihydrate ($Ca[SO_4].\frac{1}{2}H_2O$), calcium hydrogen phosphate ($CaHPO_4$), or calcium hydrogen phosphate dihydrate ($CaHPO_4.2H_2O$).

13. The method according to claim 12 wherein the rubber is natural rubber, acrylonitrile-butadiene rubber (NBR), carboxylated NBR (XNBR), hydrogenated NBR (HNBR), epichlorohydrin-ethylene oxide rubber, acrylic rubber, ethylene-propylene-diene monomer rubber (EPDM), chloroprene rubber (CR), butadiene rubber (BR), styrene-butadiene rubber (SBR), polyurethane rubber (PU), fluorinated rubber and/or silicone rubber.

14. The method according to claim 12 wherein the hydrophilic polymer is sodium polyacrylate, polyvinyl alcohol, polyacrylic acid, polyacrylamide, carboxymethyl cellulose, poly(acrylic acid-co-acrylamide), poly(hydroxyethyl methacrylate), ethylene oxide-propylene oxide-allyl glycidyl ether and/or a resin.

15. The method according to claim 12 in which auxiliary materials are added before the vulcanization.

16. The method according to claim 12 in which the rubber, the hydrophilic polymer and the inorganic salt are mixed homogeneously and subsequently vulcanized for 6-20 minutes at temperatures of 140° C.-180° C.

17. The method according to claim 12 in which the elastomeric composition is fully brought into contact with water.

18. The method according to claim 12 in which the elastomeric composition is brought into contact with water for 2-6 hours.

19. The method according to claim 12 in which the elastomeric composition is brought into contact with deionized or distilled water.

20. The method according to claim 12 in which the absorbed water is removed from the elastomeric composition for 3-4 h at 50° C.-60° C., or for 24-48 h at room temperature.

21. The method according to claim 12 in which, after the removal of the absorbed water, the elastomeric composition is subjected to a heat treatment at 160° C. to 220° C.

22. The composition according to claim 2 in which the base elastomer comprises FKM, or VMQ.

23. The composition according to claim 1 wherein the inorganic salt is in crystalline or nanocrystalline form in the elastomeric composition.

24. The method according to claim 12 wherein the at least one rubber comprises FKM, or VMQ.

25. The method according to claim 12 wherein the inorganic salt is in crystalline or nanocrystalline form in the elastomeric composition.

* * * * *